US006690839B1

(12) United States Patent  (10) Patent No.: US 6,690,839 B1
Ferguson  (45) Date of Patent: Feb. 10, 2004

(54) EFFICIENT PREDICTOR OF SUBJECTIVE VIDEO QUALITY RATING MEASURES

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/483,834

(22) Filed: Jan. 17, 2000

(51) Int. Cl.[7] .................................................. G06K 9/40
(52) U.S. Cl. ...................... 382/274; 382/260; 382/190; 348/192; 714/712
(58) Field of Search ................................ 382/112, 149, 382/162, 167, 190, 209, 210, 212, 213, 218, 219, 220, 232, 238, 239, 251, 260, 269, 274, 275; 348/189, 192, 188; 375/240.03, 240.21, 240.26; 714/712

(56) References Cited

U.S. PATENT DOCUMENTS

| | | | | |
|---|---|---|---|---|
| 5,329,379 A | * | 7/1994 | Rodriguez et al. | 382/167 |
| 5,446,492 A | * | 8/1995 | Wolf et al. | 348/192 |
| 5,694,491 A | * | 12/1997 | Brill et al. | 382/260 |
| 5,940,124 A | * | 8/1999 | Janko et al. | 348/189 |
| 5,974,159 A | * | 10/1999 | Lubin et al. | 382/106 |
| 6,067,118 A | * | 5/2000 | Chen et al. | 375/240.03 |
| 6,075,884 A | * | 6/2000 | Lubin et al. | 382/156 |
| 6,137,904 A | * | 10/2000 | Lubin et al. | 382/162 |
| 6,246,435 B1 | * | 6/2001 | Patel | 348/192 |
| 6,360,022 B1 | * | 3/2002 | Lubin et al. | 382/260 |
| 6,363,116 B1 | * | 3/2002 | Edwards et al. | 375/240.21 |
| 6,496,221 B1 | * | 12/2002 | Wolf et al. | 348/192 |

OTHER PUBLICATIONS

Wolf, et al "Objective quality assessment of digitally transmitted video", IEEE, pp. 477–482, 1991.*
Voran, et al "An objective technique for assessing video impairments", IEEE, 161–165, 1993.*
Horita, et al. "Objective picture quality scale for video coding", IEEE, pp. 319–322, 1996.*
Lin, et al. "A constant subjective quality MPEG encoder", IEEE, pp. 2177–2180, 1995.*
Watson, et al. "Design and performance of a digital video quality metric", Lecture, pp. 1–7, 1999.*
Wu, et al. "Video coding distortion classification and quantitative impairment metrics", IEEE, 962–965, 1996.*
Harding, et al. "A method for quantization scale factor selection n in MPEG2 video sequence encoding using a bilayer fuzzy expe system", IEEE, pp. 475–479, 1996.*
Chou, et al. "A perceptually tuned subband image coder based on the measure of just–noticeable–distortion profile", IEEE, pp. 467–476, 1995.*
Chaddha, et al. "Psycho–visual based distortion measures for monochrome image and video compression", IEEE, pp. 841–845 1993.*
Lin, et al. "Video perceptual distortion measure: two–dimensional versus three–dimensional approaches", IEEE, pp. 460–463, 1997.*
Lubin, et al. "A human vision system model for objective picture quality measurements", IEEE, pp. 498–503, 1997.*
Lin, et al. "Vision model based video perceptual distortion measure for video processing and applications", IEEE, pp. 3133–313 1997.*

* cited by examiner

*Primary Examiner*—Daniel Mariam
(74) *Attorney, Agent, or Firm*—Francis I. Gray

(57) ABSTRACT

An efficient predictor for subjective video quality rating measures processes a reference video and an impaired video corresponding to the reference video in respective processing channels. Each channel applies a contrast sensitivity function from a human vision system model to the respective videos and a contrast discrimination function for self-masking to the output of the contrast sensitivity function. The outputs from the channels are input to a differencing circuit to obtain absolute difference values. The absolute difference values are modified by a global masking factor derived from the output from the reference video channel, and the resulting values are converted into units conforming to a standard quality rating metric.

4 Claims, 2 Drawing Sheets

EFFICIENT PREDICTOR OF SUBJECTIVE VIDEO QUALITY RATING MEASURES

BACKGROUND OF THE INVENTION

The present invention relates to picture quality measurements, and more particularly to an efficient predictor of subjective video quality rating measures.

Video is recorded and transmitted via methods that create errors, such as video compression/decompression methods. It is of interest to produce objective measures to predict a subjective rating of these errors. Subjective ratings have been developed that involve collecting data from experiments in which persons are asked to rate both the original and corresponding impaired video. Methods have been developed that indicate, to some degree, the subjective rating of the impairment in the impaired video. So far methods have proven to be too complex and compute intensive for accurate real-time applications.

Existing methods either include computationally intensive human vision system (HVS) models, such as those described by Lubin or Daly, or include ANSI/IRT measurements that are generally faster but, given a sufficiently varied set of video content, do not correlate as well with subjective ratings as do the HVS models. The HVS models generally include one or more stages to render each of the following:

Contrast Sensitivity Function (CSF) to model the sensitivity to different spatial frequencies at a given average luminance level.

Masking, which the literature commonly describes in terms of Contrast Discrimination (CD), that includes both "self-masking" and masking across frequency bands and orientations.

The CSF portion of the HSV model is accomplished at each pixel by calculating the local ratio of high frequency energy to low (DC) frequency energy, or the equivalent, coupled with a linear filter or pyramid decomposition with appropriate frequency weighting. This provides two different filters, a highpass filter and a lowpass filter, and a division for each pixel. Where pyramid decomposition and horizontal and vertical channels are used, these operations are multiplied by the number of orientations and percentage of pixels added from the pyramid.

A large portion of the processing time required in HVS models is due to the image decomposition into a multiplicity of images, each corresponding to a set of parameter coordinates. For example the popular Lubin and Daly image decomposition parameterization is based on filters of various orientations, sequency (spatial frequency) bands and polarities. So two orientations (horizontal, vertical), two spatial frequency bands and two polarities require 2*2*2=8 images per processing stage for the reference (original) image and likewise for the impaired image.

Additionally a great deal of processing is involved in masking. However to date there is arguably insufficient experimental data acquired to fully predict masking as would be required to verify the models currently in use or proposed.

What is desired is a method and apparatus for more efficient (using less processing time and/or less expensive hardware) prediction of subjective video quality rating measures while maintaining desired accuracy.

BRIEF SUMMARY OF THE INVENTION

Accordingly the present invention provides an efficient predictor of subjective video quality rating measures that processes a reference video and corresponding impaired video directly in parallel channels based on a human vision model. The outputs from the two channels that represent maps of the respective videos are subtracted from each other to obtain an absolute difference map. A global masking scalar may be obtained from the reference video map as a measure of the busyness or complexity of the image. The global masking scalar is used to modify the difference map, which modified difference map is converted to standard picture quality analysis measurement units.

The objects, advantages and other novel features of the present invention are apparent from the following detailed description when read in conjunction with the appended claims and attached drawing.

DETAILED DESCRIPTION OF THE INVENTION

Figure 1:
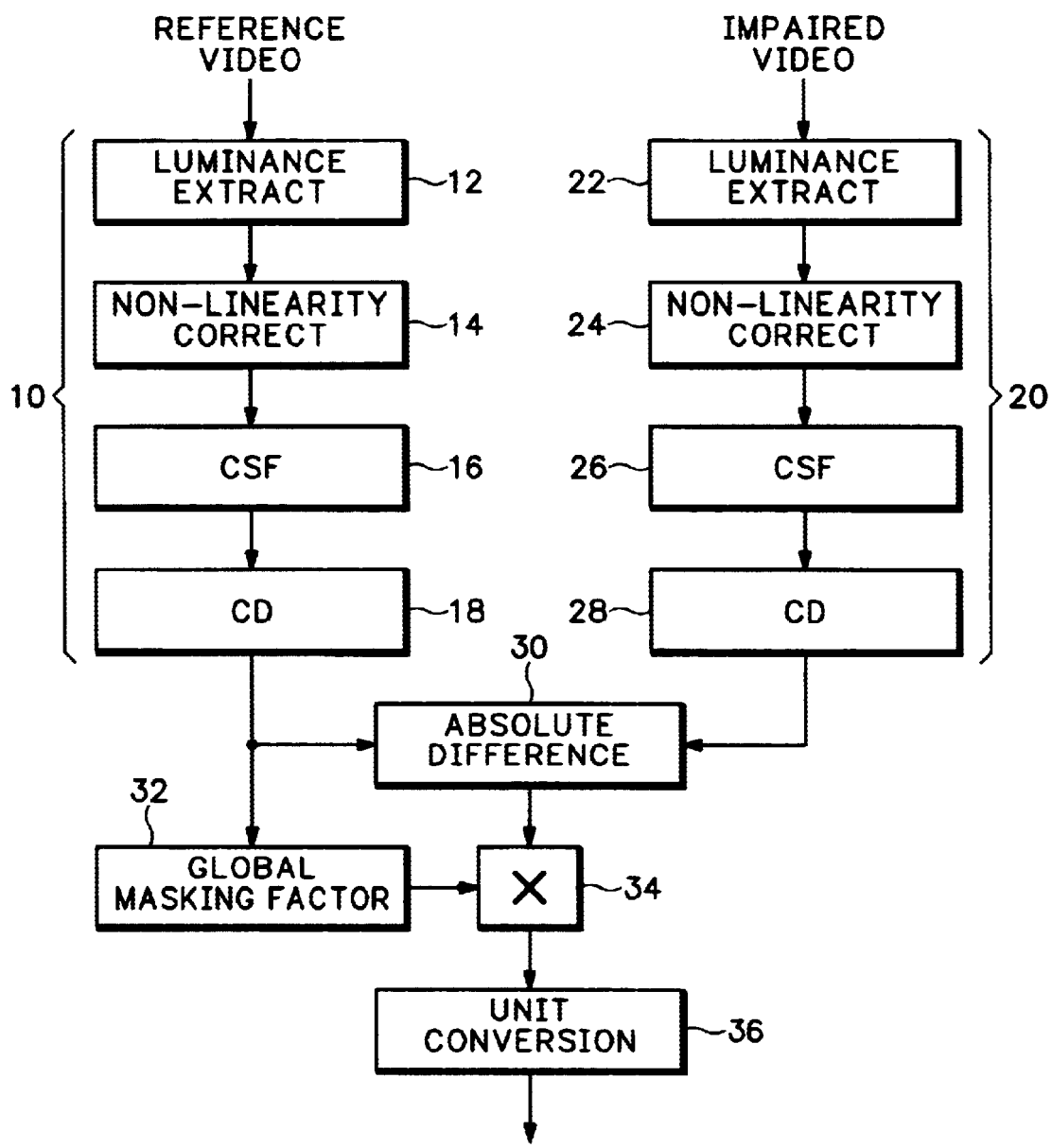
FIG. 1 is a block diagram view of an apparatus for efficient prediction of subjective video quality rating measures according to the present invention.

Referring now to FIG. 1 two channels 10, 20 are shown, one for processing a reference video and the other for processing a corresponding impaired video. Each channel has an input luminance stage 12, 22 that converts the corresponding input videos into luminance data. For example each input luminance stage 12, 22 emulates the conversion of 601 serial digital video data streams to the luminance portion of light from a display parameterized by gamma, an exponent for an exponential relationship between CRT voltage and beam current, threshold, the minimum input value to produce any light output, ambientLight, the light cast on the display screen from external sources, and Lmax, the maximum light output from the display. The output from each luminance stage 12, 22 is input to a transducer non-linearity stage 14, 24, that emulates the perceived luminance compression of increased contrast and the "dark" light threshold using the parameters L_Dark, the equivalent human response to no light translated to an input light amount, and m, the exponent for the compression type relationship between perceived and actual contrast. The luminance and transducer non-linearity stages 12, 14 or 22, 24 may be combined to produce a single look-up table to give the output of the cascade of the two stages.

The output from each transducer non-linearity stage 14, 24 is then input to a CSF stage 16, 26 that models the sensitivity at a given average luminance level. Each CSF stage output is then input to a corresponding CD stage 18, 28, which also may be a look-up table based on experimental data, that is responsible for the masking non-linearity which accounts for the "dipper function" of contrast discrimination to produce a map of the respective videos.

The resulting maps from the CD stages 18, 28 are input to a subtractor stage 30 to obtain an absolute difference, and the output from the reference CD stage 18 also is input to a global masking factor circuit 32 that measures busyness, complexity or other related metrics that are related to how much spatial masking is expected across the entire image or frame. The resulting global masking factor, or scalar, is input to a multiplier 34 together with the absolute difference from the subtractor stage 30 to reduce or increase the human vision system response accordingly. An example measurement is one that measures the percentage of pixels in a region of local average contrast above a threshold. The multiplication result from the multiplier 34 is a measurement map that is then input to a conversion stage 36 for conversion to appropriate output units, such as PQR, MOS, etc.

Figure 2:
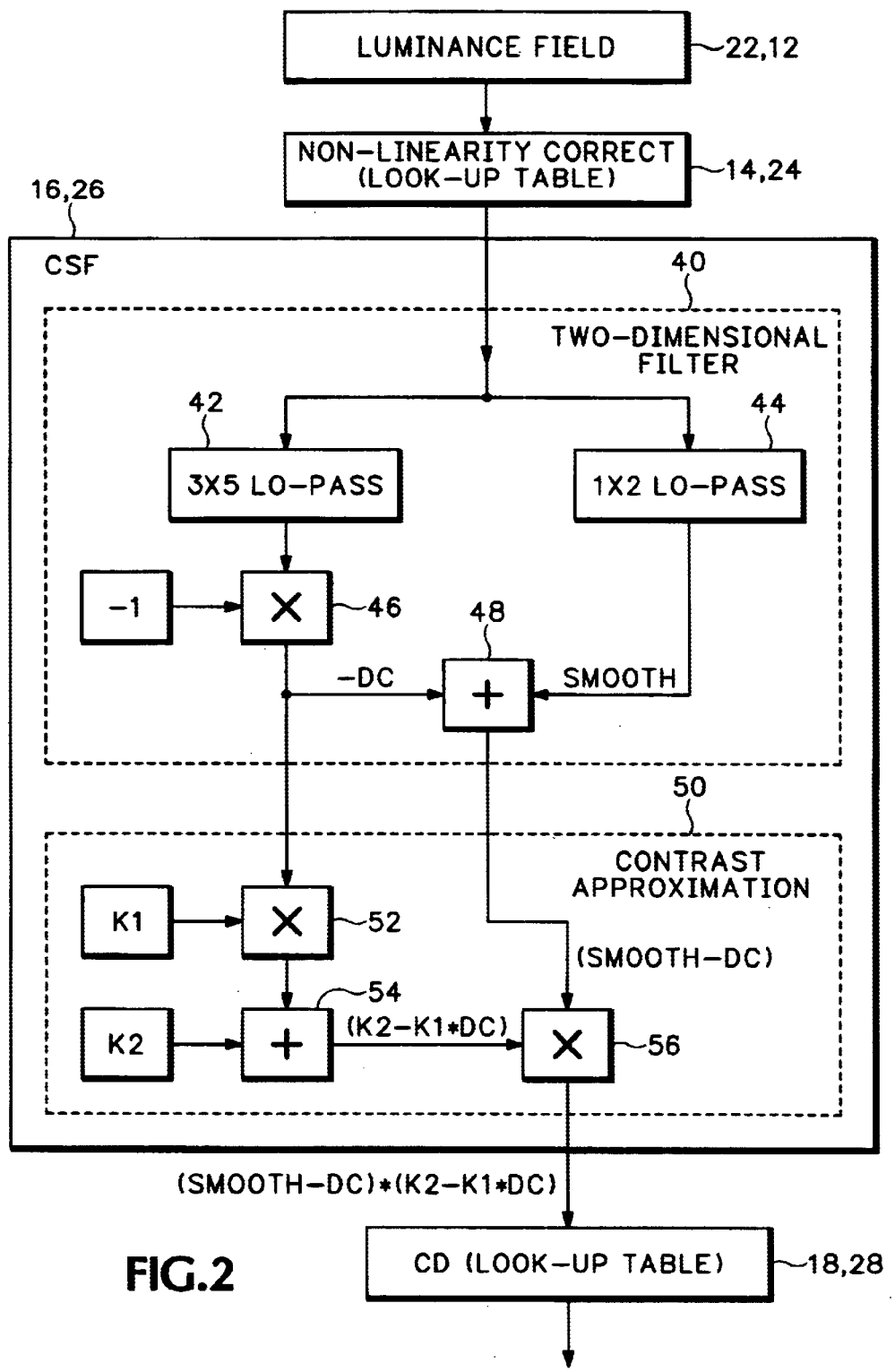
FIG. 2 is a block diagram view of one channel of the apparatus of FIG. 1 showing details of a CSF block according to the present invention.

The CSF stage 16, 26 is shown in greater detail in FIG. 2. The output from the non-linearity stage 14, 24 is input to a two-dimensional filter 40 at the input of the CSF stage. The two-dimensional filter 40, for example, has a 3×5 lowpass filter 42 and a 1×2 lowpass filter 44 to which the non-linearity stage output is input in parallel. The output from the 3×5 lowpass filter 42 is inverted by multiplication with −1 in a first multiplier 46 to provide a DC filter output and added to the output of 1×2 lowpass filter in a summing circuit 48 which results in a difference filter output that is a smoothed image less the DC filter output. The difference filter output and the DC filter output are input to a contrast approximation stage 50.

The DC filter output is input to a second multiplier 52 for multiplication by a first constant K1, which in turn is added to a second constant K2 in a summing circuit 54. The output from the summing circuit 54 is input to a third multiplier 56 together with the difference filter output to produce a final filter output=(F1−DC)*(K2−K1*DC). The final filter output is the output from the CSF stage 16, 26 that is input to the CD stage 18, 28.

Using two channels 10, 20 the video image is processed directly without being divided into a multiplicity of images as in Lubin and Daly. This prevents local cross-spatial frequency band masking. The spatial frequency response of the CSF is implemented as one two-dimensional filter 40. This filter satisfies the requirements suggested by the psycho-visual experiment data, Contrast Sensitivity versus Frequency, in available literature for each orientation. Thus there is only one image output from the CSF stage 16, 26 to be processed by subsequent stages. Filter design is controlled more by efficiency than absolute accuracy. The CSF is calculated without direct division, as the narrow dynamic range of local average luminance at this stage makes efficient division approximation nearly impossible, i.e., linear interpolation has been used previously. Finally the effects of masking in the CD stage 18, 28 are accounted for as follows: (1) self masking is performed by a direct look-up table using the output from the CSF stage 16, 26—the look-up table values are produced by direct use of the contrast discrimination data available in the literature; and (2) global masking on the difference image is performed based on the total reference edge energy, calculated using the contrast approximation output.

Accuracy is maintained by keeping derivatives as continuous as possible—all HVS-model methods use a difference of intermediate HVS images derived from the reference and impaired images. Since the difference is the primary metric used in picture quality analysis, the derivative of the HVS model prior to the difference stage with respect to the model input, either reference or impaired video, is given greater importance than overall absolute value in all look-up tables.

As is readily apparent, although the above description describes an apparatus, the efficient predictor may also be implemented in software using a processor with appropriate digital video inputs corresponding to the reference video and related impaired video.

Thus the present invention provides an efficient predictor of subjective video quality rating measures by processing the reference and impaired images directly in parallel channels, using a two-dimensional filter to implement the spatial frequency response of the contrast sensitivity function without direct division, and accounting for the effects of masking by direct look-up using the filter output and the total reference edge energy calculated using the contrast approximation output.

What is claimed is:

1. An apparatus for efficient prediction of subjective video quality rating measures comprising:

a pair of processing channels, a first channel for processing a reference video and a second channel for processing an impaired video corresponding to the reference video, the reference and impaired videos being processed directly in the respective channels according to a human vision system model without pyramid decomposition to produce a processed reference video and a processed impaired video; and means for obtaining an absolute difference between the processed reference video and the processed impaired video as a quality rating measure.

2. The apparatus as recited in claim 1 further comprising means for applying a global masking factor as a function of the processed reference video to the absolute difference, the output of the applying means being the quality rating measure.

3. The apparatus as recited in claims 1 or 2 further comprising means for converting the quality rating measure to units of a standard quality rating measure.

4. The apparatus as recited in claim 1 wherein each channel comprises:

a two-dimensional filter for obtaining a spatial frequency response for an input video, the two-dimensional filter emulating the human vision system model; and a contrast discrimination stage having the spatial frequency response as an input to account for the effects of self-masking, the output from the contrast discrimination stage being a processed video for input to the obtaining means.

* * * * *